(12) United States Patent
Sasaki et al.

(10) Patent No.: US 10,784,804 B2
(45) Date of Patent: Sep. 22, 2020

(54) MAGNETIZATION STATE CONTROL METHOD AND MAGNETIZATION STATE CONTROL DEVICE

(71) Applicants:Nissan Motor Co., Ltd., Yokohama-shi, Kanagawa (JP); Wisconsin Alumni Research Foundation, Madison, WI (US)

(72) Inventors: Kensuke Sasaki, Kanagawa (JP); Takashi Fukushige, Kanagawa (JP); Takashi Katou, Kanagawa (JP); Brent S. Gagas, Madison, WI (US); Robert D. Lorenz, Madison, WI (US)

(73) Assignees: Nissan Motor Co., Ltd., Yokohama (JP); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 15/747,830

(22) PCT Filed: Jul. 31, 2015

(86) PCT No.: PCT/US2015/043151
§ 371 (c)(1),
(2) Date: Jan. 26, 2018

(87) PCT Pub. No.: WO2017/023249
PCT Pub. Date: Feb. 2, 2017

(65) Prior Publication Data
US 2018/0219504 A1 Aug. 2, 2018

(51) Int. Cl.
*H02P 23/00* (2016.01)
*H02P 21/06* (2016.01)
*H02P 21/14* (2016.01)
*H02P 21/13* (2006.01)
*H02P 25/024* (2016.01)
(Continued)

(52) U.S. Cl.
CPC ............ *H02P 21/141* (2013.01); *H02P 21/13* (2013.01); *H02P 21/50* (2016.02); *H02P 25/022* (2013.01); *H02P 25/024* (2016.02)

(58) Field of Classification Search
CPC ....... H02P 23/009; H02P 21/06; H02P 21/141
See application file for complete search history.

(56) References Cited

U.S. PATENT DOCUMENTS

| 4,678,248 A | 7/1987 | Depenbrock |
| 2010/0079104 A1 | 4/2010 | Becker et al. |

(Continued)

FOREIGN PATENT DOCUMENTS

| JP | 2009-72046 A | 4/2009 |
| JP | 2014-197978 A | 10/2014 |

*Primary Examiner* — Cortez M Cook
(74) *Attorney, Agent, or Firm* — Global IP Counselors, LLP

(57) ABSTRACT

A magnetization state control method for a variable magnetization machine, the method includes generating a flux linkage vector while changing a magnetization state of the variable magnetization machine such that a trajectory of the flux linkage vector has a curved clockwise trajectory on a dq-axis plane and a magnitude of the flux linkage vector temporally changes, with the dq-axis plane being a synchronous reference frame with a d-axis pointing in a direction of a permanent magnet flux and a q-axis being 90 degrees ahead of the d-axis in a rotational direction of a rotor.

13 Claims, 6 Drawing Sheets

(51) Int. Cl.
*H02P 21/00* (2016.01)
*H02P 25/022* (2016.01)

(56) References Cited

U.S. PATENT DOCUMENTS

| | | | |
|---|---|---|---|
| 2012/0161685 A1 | 6/2012 | Geyer et al. | |
| 2013/0069568 A1* | 3/2013 | Krefta | H02P 21/06 318/400.02 |
| 2014/0203754 A1* | 7/2014 | Bhangu | H02P 21/0089 318/702 |
| 2015/0054433 A1* | 2/2015 | Kim | H02P 6/28 318/400.02 |

* cited by examiner

MAGNETIZATION STATE CONTROL METHOD AND MAGNETIZATION STATE CONTROL DEVICE

BACKGROUND

Field of the Invention

The present invention generally relates to a magnetization state control method and a magnetization state control device. More specifically, the present invention relates to a magnetization state control method and a magnetization state control device for a variable magnetization machine.

Background Information

Electric vehicles and hybrid electric vehicles (HEV) include an electric motor that operates as a drive source for the vehicle. In a purely electric vehicle, the electric motor operates as the sole drive source. On the other hand, an HEV includes an electric motor and a conventional combustion engine that operate as the drive sources for the vehicle based on conditions as understood in the art.

Electric vehicles and HEVs can employ an electric motor having variable magnetization characteristics as understood in the art. For example, the magnetization level of the motor can be increased to increase the torque generated by the motor. Accordingly, when the driver attempts to accelerate the vehicle to, for example, pass another vehicle, the motor control system can change the magnetization level by applying a pulse current for increasing the torque output of the motor and thus increasing the vehicle speed.

In a typical motor control system, an inverter applies the control voltage to the motor. However, at a high motor speed, the voltage induced in the control system by the pulse current can be increased to a high voltage level. At this high voltage level, the inverter may be no longer capable of providing enough voltage to drive the motor at the desired speed.

On the other hand, an electric motor having a boosting circuit in addition to an inverter is known in the art (see JP 2007-240833, for example). With this electric motor, the boosting circuit is operated at the high motor speed to fill the voltage gap of the inverter.

SUMMARY

However, with this conventional electric motor, the boosting circuit makes a loss even if the boosting circuit is not operated. Thus, with this electric motor, the loss reduction due to the magnetization state control is canceled out by the loss of the boosting circuit, and thus the total motor efficiency from the electrical input power to the mechanical output power will not be properly improved.

One object of the present application is to provide a magnetization state control method and a magnetization state control device with which the total efficiency from the electrical input power to the mechanical output power can be improved without providing an additional boosting circuit.

In view of the state of the known technology, one aspect of a magnetization state control method for a variable magnetization machine includes generating a flux linkage vector while changing a magnetization state of the variable magnetization machine such that a trajectory of the flux linkage vector has a curved clockwise trajectory on a dq-axis plane and a magnitude of the flux linkage vector temporally changes, with the dq-axis plane being a synchronous reference frame with a d-axis pointing in a direction of a permanent magnet flux and a q-axis being 90 degrees ahead of the d-axis in a rotational direction of a rotor.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

First Embodiment

Figure 1:
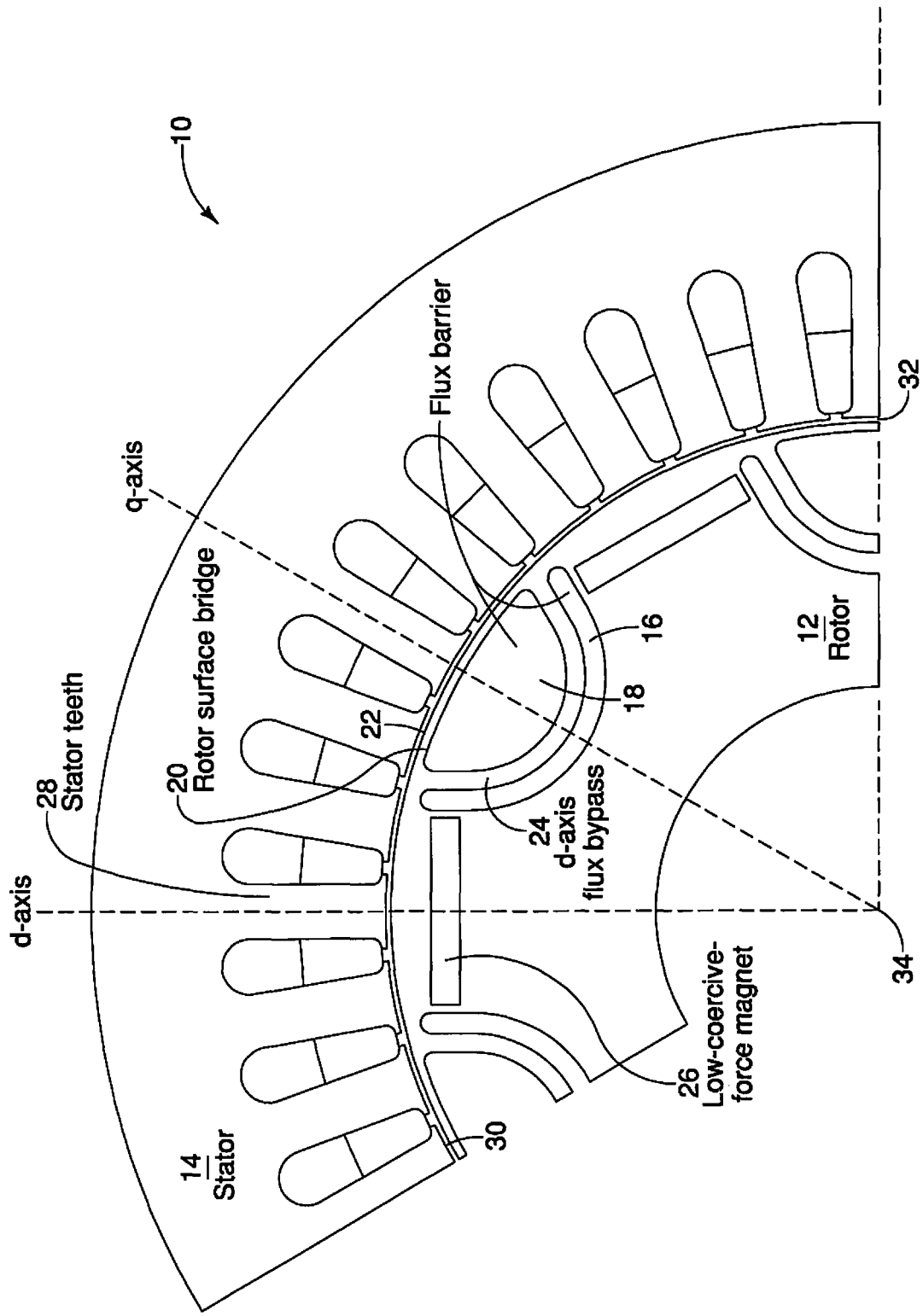
FIG. 1 is a partial cross-sectional view of a variable magnetization machine according to a first embodiment.

As shown in FIG. 1, a variable magnetization machine 10, which can also be referred to as a variable magnetization motor or other type of variable flux machine, includes a rotor 12 and a stator 14. As discussed herein, the terms variable magnetization machine and variable flux machine can be used synonymously to refer to the same type of machine. The variable magnetization machine 10 can be employed in any type of electric vehicle or HEV such as an automobile, truck, SUV and so on, and in any other type of apparatus as understood in the art. The rotor 12 and the stator 14 can be made of metal or any other suitable material as understood in the art.

In this example, the rotor 12 is configured to include a plurality of pairs of flux barriers 16 and 18, which can be configured as air gaps or can include any suitable type of insulating material as is conventional in the art. Although only one full pair and two partial pairs of the flux barriers 16 and 18 are shown, in this example, six pairs of flux barriers 16 and 18 can be spaced at 60 degree angles about the outer perimeter of the rotor 12. Naturally, the rotor 12 can include as many pairs of flux barriers 16 and 18 as deemed appropriate for the environment in which the variable magnetization machine 10 is employed. Also, as shown in this example, a q-axis passes through the center of a pair of flux barriers 16 and 18. However, the pairs of flux barriers 16 and 18 can be positioned at any suitable location with respect to the q-axis to achieve the operability of the embodiments discussed herein.

As further shown, a surface bridge 20 of the rotor 12 is present between the radially outward boundary of each flux barrier 18 and the outer circumference 22 of the rotor 12. Furthermore, a d-axis flux bypass 24 is present between each of the adjacent pairs of flux barriers 16 and 18. In this example, the surface bridges 20 and d-axis flux bypasses are made of the same material as the rotor 12. However, the surface bridges 20 and d-axis bypasses 24 can be made of any suitable type of material as known in the art.

In addition, a plurality of low-coercive-force magnets 26 are spaced between adjacent pairs of flux barriers 16 and 18 about the circumference of the rotor 12. As indicated, each of these magnets 26 extend longitudinally in a perpendicular or substantially perpendicular direction with respect to portions of adjacent flux barriers 16. However, the magnets 26 can be configured in any suitable size and shape. Also, in this example, the rotor 12 includes six magnets 26 which are positioned between the six pairs of flux barriers 16 and 18 and spaced at 60 degree intervals in a circumferential direction about the rotor 12. However, the number of magnets 26 can change with respect to a change in the number of pairs of flux barriers 16 and 18. Furthermore, each magnet 26 can be configured as a plurality of magnets. In this example, a d-axis passes through a center of a magnet 26. However, the magnets 26 can be positioned at any suitable location with respect to the d-axis to achieve the operability of the embodiments discussed herein.

The stator 14 includes a plurality of stator teeth 28 and other components such as windings (not shown) which can be configured in any conventional manner. In this example, the stator teeth 28 are configured as wide stator teeth as known in the art. However, the stator teeth 28 can have any suitable size, and the stator 14 can include any number of stator teeth 28 to achieve the operability of the embodiments discussed herein. In this example, the stator teeth 28 are open to the inner circumference 30 of the stator 14, but can be closed if desired. Also, an air gap 32 is present between the outer circumference 22 of the rotor 12 and the inner circumference 30 of the stator 14 to enable the rotor 12 to rotate unrestrictedly or substantially unrestrictedly about a center axis 34.

Figure 2:
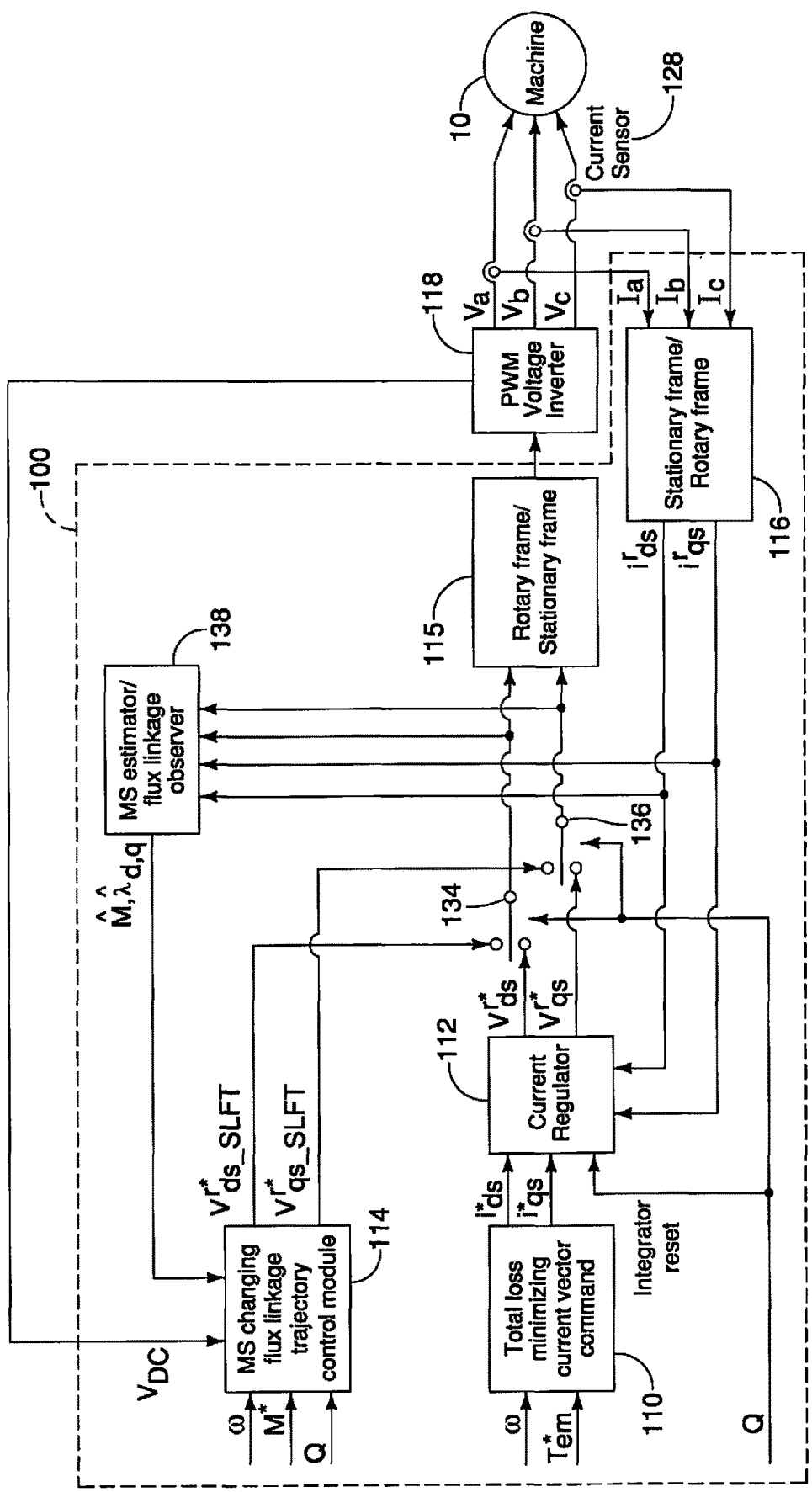
FIG. 2 is a block diagram illustrating an example of components of a variable magnetization machine controller for controlling the variable magnetization machine illustrated in FIG. 1 according to the first embodiment.

Referring now to FIG. 2, an example of components of a variable magnetization machine controller 100 (hereinafter referred to as a "controller 100"). The controller 100 is employed in a vehicle to control the variable magnetization machine 10. The vehicle can be an electric vehicle or HEV such as an automobile, truck, SUV or any other suitable type of vehicle. As understood in the art, when a driver presses the accelerator, an acceleration signal is input to an electronic control unit (ECU) (not shown) or any other suitable type of controller. Also, a speed sensor, such as a tachometer or any other suitable type of sensor, senses the rotational speed of, for example, a drive wheel of the vehicle and provides a vehicle speed signal to the ECU. The configuration of the ECU is well known in the art. Thus, the detailed descriptions will be omitted for the sake of brevity.

The ECU outputs signals to control the speed and the torque of the variable magnetization machine 10 to reach the appropriate machine operating state to achieve the desired vehicle acceleration as understood in the art. Also, the ECU outputs signals representing a target magnetization state (M/S) signal M* (hereinafter referred to as a "target M/S signal M*") and a magnetization state (M/S) change flag signal Q (hereinafter referred to as an "M/S change flag signal Q") in a well know manner in the art for the magnetization state control of the variable magnetization machine 10. Specifically, the ECU outputs the M/S change flag signal Q as a pulse signal in synchronization with the target M/S signal M* such that the variable magnetization machine 10 is further controlled in accordance with this pulse signal. The target M/S signal M* is indicative of a target magnetization state of the variable magnetization machine 10, such as a magnetization rate (%) of the magnet of the variable magnetization machine 10. The ECU can calculate the target M/S signal M* and the M/S change flag signal Q as understood in the art. Thus, the detailed descriptions will be omitted for the sake of brevity.

As shown in FIG. 2, the controller 100, which can be a magnetization state and torque controller, receives the signals representing the target M/S signal M* and the M/S change flag signal Q, and outputs a magnetization state and torque control signal, such as a pulse width modulated (PWM) signal, to control the variable magnetization machine 10. That is, the controller 100 is coupled to an e-powertrain which includes, for example, a battery, an inverter arrangement 118, and the variable magnetization machine 10. In this example, the inverter arrangement 118 can be, for example, a pulse width modulator (PWM) voltage inverter, or any other suitable type of inverter configuration as understood in the art.

As shown in FIG. 2, the controller 100 in this example includes a magnetization state changing flux linkage trajectory control module 114 (hereinafter referred to as a "M/S changing flux linkage trajectory control module 114") (e.g., a controller of the present application), a total loss minimizing current vector command module 110, a current regulator 112, a rotary frame/stationary frame component 115, and a stationary frame/rotary frame component 116, and a magnetization state estimator/flux linkage observer 138 (hereinafter referred to as a "M/S estimator/flux linkage observer 138"). In this example, the output of the rotary frame/stationary frame component 115 is coupled to the e-powertrain and, in particular, to the inverter arrangement 118 which provides power to the variable magnetization machine 10.

As can be appreciated by one skilled in the art, the controller 100 preferably includes at least one microcomputer with a control program that controls the components of the controller 100 as discussed below. Thus, the microcomputer or microcomputers can be configured and program to embody any or all of the M/S changing flux linkage trajectory control module 114, the total loss minimizing current vector command module 110, the current regulator 112, the rotary frame/stationary frame component 115, the stationary frame/rotary frame component 116, and the M/S estimator/flux linkage observer 138. The controller 100 includes other conventional components such as an input interface circuit, an output interface circuit, and storage devices such as a ROM (Read Only Memory) device and a RAM (Random Access Memory) device. It will be apparent to those skilled in the art from this disclosure that the precise structure and algorithms for the controller 100 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause. Furthermore, the controller 100 can communicate with the variable magnetization machine 10 in any suitable manner as understood in the art. In addition, although several of the components of the controller 100 are described as modules, these components need not be individual or separate components, and one component or module can perform the operations of multiple components or modules discussed herein. Also, each module can include a microcontroller as discussed above or multiple modules can share one or more microcontrollers.

As further shown in FIG. 2, the total loss minimizing current vector command module 110 receives a torque command $T^*_{em}$ and a sensed or estimated rotational speed signal w of the rotor 12 from, for example, the ECU (not shown) in response to, for example, a driver of the vehicle attempting to accelerate the vehicle. In response, the total loss minimizing current vector command module 110 outputs a d-axis current command signal $i^*_{ds}$ and a q-axis current command signal $i^*_{qs}$ for selecting the optimum d-axis current $i_d$ and the optimum q-axis current $i_q$. That is, in this example, the total loss minimizing current vector command module 110 outputs the d-axis current command signal $i^*_{ds}$ and the q-axis current command signal $i^*_{qs}$ to the current regulator 112.

As also shown in FIG. 2, the M/S changing flux linkage trajectory control module 114 receives the sensed or estimated rotational speed signal ω, as well as the target M/S signal M* and the M/S change flag signal Q. Also, the M/S changing flux linkage trajectory control module 114 receives an estimated magnetization signal M̂ and an estimated stator flux linkage $\hat{\lambda}_{d,q}$ from the M/S estimator/flux linkage observer 138. The M/S changing flux linkage trajectory control module 114 further receives a DC bus voltage signal $V_{DC}$ from the inverter arrangement 118. Then, the M/S changing flux linkage trajectory control module 114 calculates or generates a target trajectory of the flux linkage vector on the dq-axis plane, and output the d-axis voltage command signal $V_{ds\_SLFT}$ and the q-axis voltage command signal $V^{r*}_{qs\_SLFT}$ according to the target trajectory of the flux linkage vector. In other words, the M/S changing flux linkage trajectory control module 114 (e.g., the controller) calculates the target trajectory of the flux linkage vector on the dq-axis plane based on the sensed or estimated rotational speed signal ω (e.g., the rotor rotating speed), the estimated magnetization signal M (e.g., the current magnetization level), the target M/S signal M* (e.g., the target magnetization level), the estimated stator flux linkage $\hat{\lambda}_{d,q}$ (e.g., the stator flux linkage amount), and the DC bus voltage signal $V_{DC}$ (e.g., the inverter output voltage capability) The processing of the M/S changing flux linkage trajectory control module 114 will be described later.

The M/S change flag signal Q is also provided to the current regulator 112 and switches 134 and 136. The M/S change flag signal Q takes a high value when the magnetization state is to be changed. Accordingly, depending on the state of the M/S change flag signal Q, the switch 134 will be controlled to provide either the d-axis voltage command signal $V^{r*}_{ds\_SLFT}$ received from the M/S changing flux linkage trajectory control module 114, or the d-axis voltage command signal $V^{r*}_{ds}$ received from the current regulator 112, to the rotary frame/stationary frame component 115.

Similarly, depending on the state of the M/S change flag signal Q, the switch 136 will be controlled to provide either the q-axis voltage command signal $V^{r*}_{qs\_SLFT}$ received from the M/S changing flux linkage trajectory control module 114, or the q-axis voltage signal command $V^{r*}_{qs}$ received from the current regulator 112, to the rotary frame/stationary frame component 115. Thus, the controller 100 controls the switches 134 and 136 to alternate between providing an output of the M/S changing flux linkage trajectory control module 114 and an output of the current regulator 112 to control the d-axis voltage and the q-axis voltage. For example, when the magnetization state is to be changed (i.e., when M/S change flag signal Q takes the high value), the switches 134 and 136 will be controlled to provide the d-axis voltage command signal $V^{r*}_{ds\_SLFT}$ and the q-axis voltage command signal $V^{r*}_{qs\_SLFT}$ received from the M/S changing flux linkage trajectory control module 114 to the rotary frame/stationary frame component 115. The M/S change flag signal Q can also reset the current regulator 112 as indicated. Thus, the controller 100 can deactivate at least one of an integrator and an accumulator in the current regulator 112 using the M/S change flag signal Q while the controller 100 controls the switches 134 and 136 to provide the output of M/S changing flux linkage trajectory control module 114 to control the d-axis voltage and the q-axis voltage.

As further shown in FIG. 2, the rotary frame/stationary frame component 115 provides the voltage signals to the inverter arrangement 118, which provides voltages $V_a$, $V_b$ and $V_c$ to the three poles of the variable magnetization machine 10. As shown in FIG. 2, the inverter arrangement 118 outputs the DC bus voltage signal $V_{DC}$ indicative of the DC bus voltage that is applied to the inverter arrangement 118 as understood in the art. As further shown in FIG. 2, current sensors 128 sense the currents associated with $V_a$, $V_b$ and $V_c$ being applied to the variable magnetization machine 10. The current sensors 128 provide the sensed current signals $I_a$, $I_b$ and $I_c$ to the stationary frame/rotary frame component 116. The stationary frame/rotary frame component 116 thus provides a detected d-axis current signal $i^r_{ds}$ and a detected q-axis current signal $i^r_{qs}$ to the current regulator 112 and the the M/S estimator/flux linkage observer 138. As understood in the art, the current regulator 112 regulates the d-axis voltage command signal $V^{r*}_{ds}$ and q-axis voltage command signal $V^{r*}_{qs}$ based on the d-axis current signal $i^r_{ds}$ and the detected q-axis current signal $i^r_{qs}$ that are fed back from the stationary frame/rotor frame component 116.

Also, as shown in FIG. 2, the controller 100 include the M/S estimator/flux linkage observer 138. The M/S estimator/flux linkage observer 138 estimates the current magnetization state (e.g., the current magnetization level) of the variable magnetization machine 10 and the stator flux linkage amount based on at least one of the phase current measurement value (i.e., the detected d-axis current signal $i^r_{ds}$ and the detected q-axis current signal $i^r_{qs}$) provided by the stationary frame/rotary frame component 116 and the inverter output voltage command value (i.e., the d-axis voltage and the q-axis voltage commands) provided by the switches 134 and 136. For example, the M/S estimator/flux linkage observer 138 can estimate the current magnetization state of the variable magnetization machine 10 based on the detected d-axis current signal $i^r_{ds}$ and the detected q-axis current signal $i^r_{qs}$ provided by the stationary frame/rotary frame component 116 as understood in the art. Also, the M/S estimator/flux linkage observer 138 can be configured as a Luenberger style observer for machine electrical state variables associated with the variable magnetization machine 10. In this example, the M/S estimator/flux linkage observer 138 can estimate the stator flux linkage amount based on the detected d-axis current signal $i^r_{ds}$ and the detected q-axis current signal $i^r_{qs}$ provided by the stationary frame/rotary frame component 116 and the inverter output voltage command value (i.e., the d-axis voltage and the q-axis voltage commands) provided by the switches 134 and 136 as understood in the art. Then, the M/S estimator/flux linkage observer 138 outputs the estimated magnetization signal M indicative of the current magnetization state of the variable magnetization machine 10 and the estimated stator flux linkage $\hat{\lambda}_{d,q}$ indicative of the stator flux linkage amount to the M/S changing flux linkage trajectory control module 114.

Figure 3B:
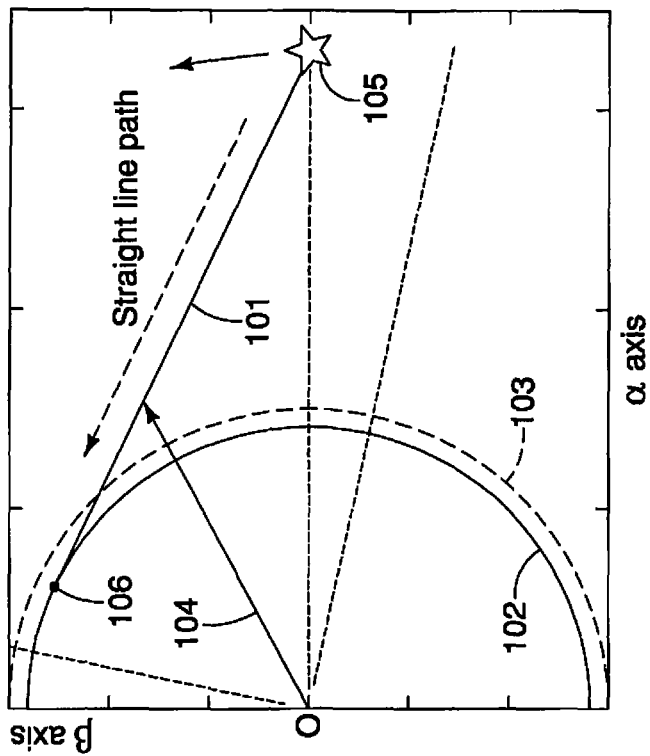
FIG. 3B is a graph illustrating an example of a target trajectory of the flux linkage vector on an αβ-axis plane for the magnetization state control according to the first embodiment.
Figure 3A:
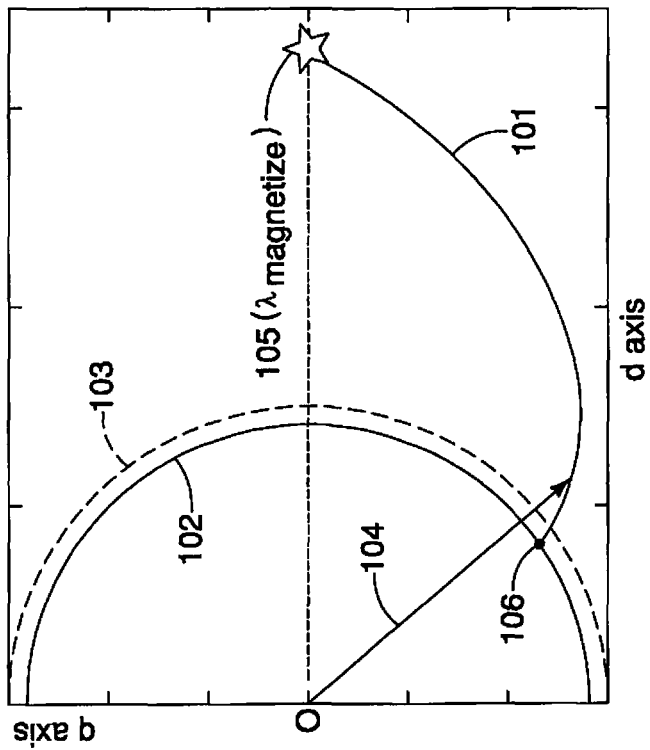
FIG. 3A is a graph illustrating an example of a target trajectory of a flux linkage vector on a dq-axis plane for a magnetization state control according to the first embodiment.

FIGS. 3A and 3B illustrate an example of the target trajectory of the flux linkage vector in accordance with the first embodiment that is generated by the M/S changing flux linkage trajectory control module 114. Basically, the magnetization state control for changing the magnetization state of the variable magnetization machine 10 is a process of magnetizing/demagnetizing the magnets 26 of the variable magnetization machine 10 by changing the magnet flux linkage. Specifically, during this magnetization state control, the tip of the flux linkage vector draws a trajectory extending from an initial operating point (e.g., an initial steady state) to a target magnetization point, such as a full magnetization point or a partial magnetization point, and back from the target magnetization point to a final operating point (e.g., an final steady state) without crossing a demagnetizing boundary. Then, the M/S changing flux linkage trajectory control module 114 outputs the d-axis voltage command signal $V^{r*}_{ds\_SLFT}$ and the q-axis voltage command signal $V^{r*}_{qs\_SLFT}$ according to the target trajectory of the flux linkage vector.

Specifically, in the illustrated embodiment, the M/S changing flux linkage trajectory control module 114 determines a target flux linkage $\lambda_{magnetize}$ according to the target M/S signal M* as understood in the art. For example, the controller 100 can store a table indicative of the relationship between the target M/S signal M* and the target flux linkage $\lambda_{magnetize}$ in advance, and then the M/S changing flux linkage trajectory control module 114 can determine the target flux linkage $\lambda_{magnetize}$ according to the target M/S signal M* based on the table as understood in the art. Of course, the M/S changing flux linkage trajectory control module 114 can determine the target flux linkage $\lambda_{magnetize}$ according to the target M/S signal M* in any other manners as understood in the art.

Furthermore, the M/S changing flux linkage trajectory control module 114 generates a target trajectory of the flux linkage vector from the initial or current operating point to the target magnetization point (i.e., the target flux linkage $\lambda_{magnetize}$) and back to the final operating point in a manner described below. Then, the M/S changing flux linkage trajectory control module 114 outputs the d-axis voltage command signal $V^{r*}_{ds\_SLFT}$ and the q-axis voltage command signal $V^{r*}_{qs\_SLFT}$ to generate the flux linkage in the variable magnetization machine 10 according to the target trajectory of the flux linkage vector. The M/S changing flux linkage trajectory control module 114 can calculate the d-axis voltage command signal $V^{r*}_{ds\_SLFT}$ and the q-axis voltage command signal $V^{r*}_{qs\_SLFT}$ according to the target trajectory of the flux linkage vector as understood in the art. For example, the M/S changing flux linkage trajectory control module 114 calculates or outputs the d-axis voltage command signal $V^{r*}_{ds\_SLFT}$ and the q-axis voltage command signal $V^{r*}_{qs\_SLFT}$ to minimize the error between the flux linkage given by the target trajectory of the flux linkage vector and the estimated stator flux linkage $\hat{\lambda}_{d,q}$ that is fed back from the M/S estimator/flux linkage observer 138 as understood in the art. Of course, the M/S changing flux linkage trajectory control module 114 can calculate or output the the d-axis voltage command signal $V^{r*}_{ds\_SLFT}$ and the q-axis voltage command signal $V^{r*}_{qs\_SLFT}$ in any other suitable manner in the art. For example, the M/S changing flux linkage trajectory control module 114 can calculate the d-axis voltage command signal $V^{r*}_{ds\_SLFT}$ and the q-axis voltage command signal $V^{r*}_{qs\_SLFT}$ using the estimated magnetization signal M and the estimated stator flux linkage $\hat{\lambda}_{d,q}$ that are fed back from the M/S estimator/flux linkage observer 138 to minimize errors relative to the target M/S signal M* and the target trajectory of the flux linkage vector.

Referring now to FIGS. 3A and 3B, the target trajectory generation in accordance with the first embodiment will be described. FIG. 3A illustrates a target trajectory 101 of a flux linkage vector 104 from a target magnetization point 105 (a target flux linkage $\lambda_{magnetize}$) to a final operating point 106 on the dq-axis plane. In other words, the target trajectory 101 is a trajectory of the flux linkage vector 104 after magnetizing to the target magnetization point 105 represented by the target M/S signal M* until moving back to the final operating point 106. FIG. 3A also illustrates a base circle 102 and a rated voltage circle 103. The base circle 102 is indicative of the location of the final operating point 106. The rated voltage circle 103 is indicative of the boundary of the flux linkage vector 104 with the rated voltage.

In the illustrated embodiment, as illustrated in FIG. 3A, the target trajectory 101 of the flux linkage vector 104 has a curved clockwise trajectory on the dq-axis plane about the origin O of the dq-axis plane and the magnitude of the flux linkage vector 104 temporally changes. Here, the dq-axis plane is the synchronous reference frame with the d-axis pointing in a direction of the permanent magnet flux and the q-axis being 90 electrical degrees ahead of the d-axis in the rotational direction of the rotor 12. In other words, the q-axis is perpendicular to the d-axis, and points in a direction of the rotational direction of the rotor 12.

Also, in the illustrated embodiment, the flux linkage vector 104 has an initial point at the origin O of the dq-axis plane, and the magnitude of the flux linkage vector 104 at the target magnetization point 105 (e.g., a timing of a completion of a target magnetization) is larger than the magnitude of the flux linkage vector 104 at a later timing thereof when changing the magnetization state to a larger magnetization amount than a current magnetization amount.

Also, in the illustrated embodiment, as shown in FIG. 3A, the target trajectory 101 of the flux linkage vector 104 on the dq-axis plane has an involute or substantially involute trajectory. Specifically, in the illustrated embodiment, the target trajectory 101 is an involute with respect to the base circle 102.

Also, in the illustrated embodiment, the target trajectory 101 of the flux linkage vector 104 on the dq-axis plane has an involute or substantially involute trajectory expressed by the following formula (1):

$d = \lambda_{magnetize} \cos(-p\omega t) - Vt \sin(\theta - p\omega t)$ $q = \lambda_{magnetize} \sin(-p\omega t) - Vt \sin(\theta - p\omega t)$ \qquad (1)

where $\theta = \cos^{-1}(\lambda_{dq}/\lambda_{magnetize})$, $\lambda_{dq}$ represents a base circle radius of the base circle 102 for the involute trajectory, $\lambda_{magnetize}$ represents the target flux linkage at the target magnetization point 105, V represents a given voltage or a DC bus voltage applied to the inverter arrangement 118, p represents a number of pole pairs of the variable magnetization machine 10, ω represents a rotor rotating speed of the rotor 12, and t represents time after the target magnetization (i.e., time after the completion of the target magnetization).

Specifically, with the formula (1), the base circle $\lambda_{dq}$ can be predetermined in advance and stored in the controller 100, or can be set according to the initial or final operating state as understood in the art. The target flux linkage $\lambda_{magnetize}$ can be calculated based on the target M/S signal M* as understood in the art. The DC bus voltage V can be acquired based on the DC bus voltage signal VDC from the inverter arrangement 118. Also, the number of pole pairs p can be prestored in the controller 100, and the rotor rotating speed ω can be received from the ECU as mentioned above.

In the illustrated embodiment, the target trajectory 101 of the flux linkage vector 104 from the target magnetization point 105 to the final operating point 106 within the rated voltage circle 103 is calculated as an involute expressed by the formula (1). Of course, a target trajectory of the flux linkage vector 104 from the initial operating point to the target magnetization point 105 can also be calculated in the same manner using the formula (1) as understood in the art. Alternatively, the target trajectory of the flux linkage vector 104 from the initial operating point to the target magnetization point 105 can be calculated in any other suitable manner as understood in the art. In this case, the target trajectory of the flux linkage vector 104 from the initial operating point to the target magnetization point 105 also has a curved clockwise trajectory on the dq-axis plane about the origin O of the dq-axis plane and the magnitude of the flux linkage vector 104 temporally changes.

FIG. 3B illustrates the target trajectory 101 of the flux linkage vector 104 from the target magnetization point 105 to the final operating point 106 on the αβ-axis plane. When the the flux linkage vector 104 describes the involute or substantially involute trajectory 101 shown in FIG. 3A on dq-axis plane, the flux linkage vector 104 describes the straight trajectory (or straight line path) 101 shown in FIG. 3B on the αβ-axis plane.

Specifically, in the illustrated embodiment, as shown in FIG. 3B, the target trajectory 101 of the flux linkage vector 104 on the αβ-axis plane has a straight or substantially straight trajectory. Here, the αβ-axis plane is a stationary reference frame with the α-axis coinciding with a phase coil center (or the center axis 34) and pointing in a direction in which a magnetomotive force is generated such that a magnet flux linkage increases when the α-axis coincides with the d-axis and the β-axis being 90 degrees ahead of the α-axis in the rotational direction of the rotor 12. In other words, the β-axis is perpendicular to the α-axis, and points in a direction of the rotational direction of the rotor 12.

Also, in the illustrated embodiment, the target trajectory 101 on the αβ-axis is a tangent line to the base circle 102 with the base circle radius $\lambda_{dq}$ and the center coinciding with the origin O of the αβ-axis plane. Also, this tangent line passes through the target magnetization point 105 (the target flux linkage $\lambda_{magnetize}$) on the αβ-axis.

As illustrated in FIGS. 3A and 3B, during the magnetization state control in accordance with the first embodiment, the tip of the flux linkage vector 104 moves from the initial operating point within the rated voltage circle 103 to the target magnetization point 105, and then back to the final operating point 106 within the rated voltage circle 103. Normally, when the target magnetization point 105 (the target flux linkage $\lambda_{magnetize}$) is outside the rated voltage circle 103, it is difficult to properly move the flux linkage vector 104 to the target magnetization point 105 and back to the final operating point 106 without inducing the excess voltage larger than the voltage limit of the inverter arrangement 118.

However, in the illustrated embodiment, as understood from the formula (1), the term of the speed electromotive force in the voltage equation on the dq-axis plane can be suppressed by rotating the flux linkage vector 104 on the dq-axis plane at the speed pω. Thus, even if the target magnetization point 105 is outside the rated voltage circle 103, the flux linkage vector 104 can properly move from the initial operating point within the rated voltage circle 103 to the target magnetization point 105, and then back from the target magnetization point 105 to the final operating point 106 within the rated voltage circle 103.

Also, in the illustrated embodiment, as shown in FIG. 3B, the target trajectory 101 of the flux linkage vector 104 is a straight line. Thus, regardless of the speed electromotive force, the supplied voltage can be maximally utilized for moving the flux linkage vector 104. Also, by describing the above-mentioned target trajectory 101, the magnitude of the flux linkage vector 104 decreases after the completion of the target magnetization. Therefore, the operating point represented by the tip of the flux linkage vector 104 can move within the rated voltage circle 103 while preventing the demagnetization.

With this arrangement, the required voltage of the magnetization state control can be suppressed, the speed range during the magnetization state control can be increased without providing an additional booster circuit, and the magnetization level required for high efficiency can be selected even at the high speed, which also improves the motor efficiency.

In accordance with an aspect of the present application, the target trajectory 101 of the flux linkage vector 104 has a curved clockwise trajectory on the dq-axis plane and the magnitude of the flux linkage vector 104 temporally changes. Thus, the required voltage of the magnetization state control can be reduced. Therefore, the magnetization of the variable magnetization machine 10 can be performed without providing an additional booster circuit, which also improves the motor efficiency.

In accordance with an aspect of the present application, the magnitude of the flux linkage vector 104 at the timing of the completion of the magnetization is larger than the magnitude of the flux linkage vector 104 at a later timing thereof. Thus, demagnetization of the magnet (e.g., the low coercive force magnet 26) while transitioning to the final operating point (or final steady state) after the completion of the magnetization can be prevented. Therefore, the speed range during the magnetization can be increased, and the magnetization level required for high efficiency can be selected even at the high speed, which also improves the motor efficiency.

In accordance with an aspect of the present application, the target trajectory 101 of the flux linkage vector 104 on the dq-axis plane has an involute or substantially involute trajectory. Thus, the voltage use rate utilized for the change in the flux linkage vector 104 can be improved. Therefore, the speed range during the magnetization can be increased, and the magnetization level required for high efficiency can be selected even at the high speed, which also improves the motor efficiency.

In accordance with an aspect of the present application, a control block (i.e., the M/S changing flux linkage trajectory control module 114) configured to calculate the target trajectory 101 of the flux linkage vector 104 on the dq-axis plane is provided. Thus, the magnetization/demagnetization state control can be performed with only a small change relative to a conventional control block. Therefore, the motor efficiency can be improved while suppressing the cost increase.

In accordance with an aspect of the present application, a control block (i.e., the M/S estimator/flux linkage observer 138) configured to estimate the stator flux linkage amount and the current magnetization level is provided. Thus, the magnetization/demagnetization state control can be performed without providing sensors and the like. Therefore, the motor efficiency can be improved while suppressing the cost increase. However, alternatively, instead of providing the M/S estimator/flux linkage observer 138, the controller 100 can include sensors to sense the stator flux linkage amount and the current magnetization level, respectively. With this configuration, the calculation load on the controller 100 can be decreased.

In the illustrated embodiment, the M/S changing flux linkage trajectory control module 114 generates the target trajectory 101 from the target magnetization point 105 to the final operating point 106 on the base circle 102. However, after reaching the final operating point 106 on the base circle 102, the operating point can further be moved within the base circle to a steady state point as needed and/or desired as understood in the art.

Second Embodiment

Figure 4:
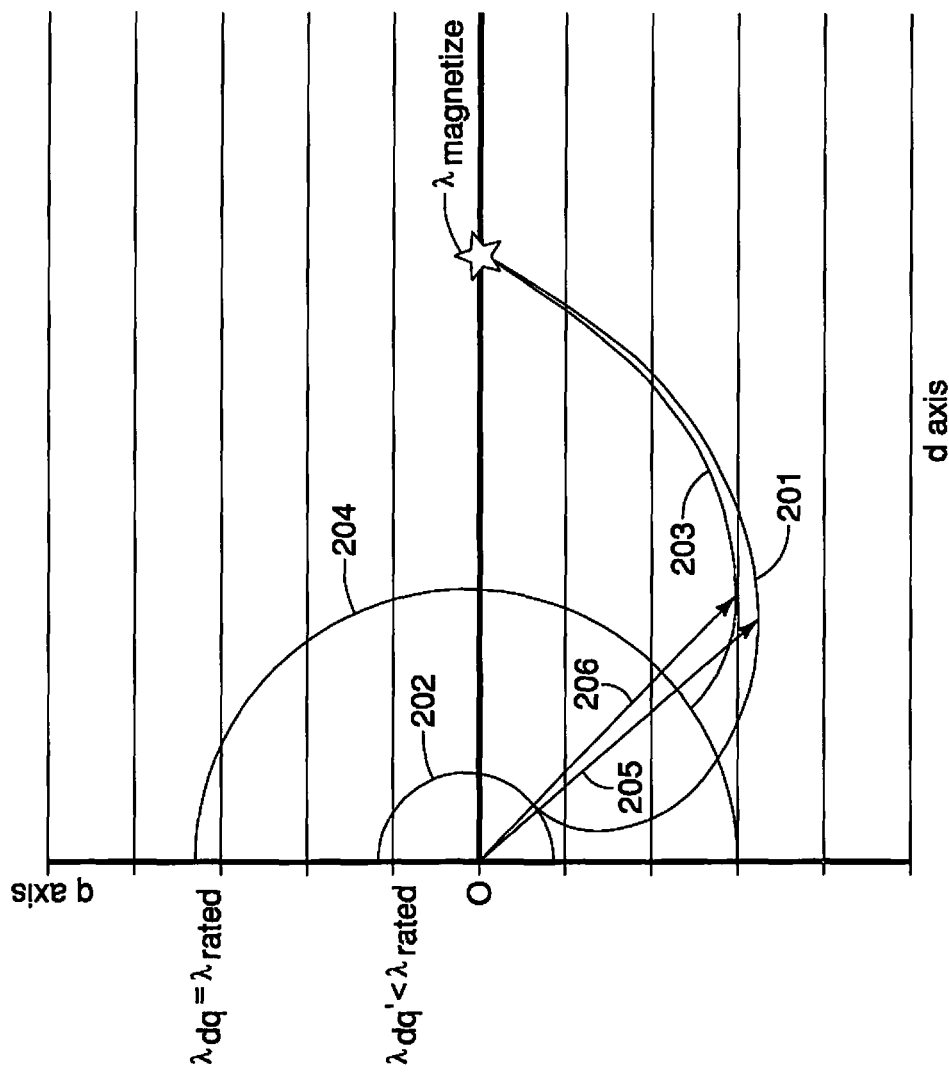
FIG. 4 is a graph illustrating an example of a target trajectory of a flux linkage vector on the dq-axis plane for a magnetization state control according to a second embodiment.

Referring now to FIG. 4, an example of components of a variable magnetization machine controller 100 (also referred to as a controller 100) in accordance with a second embodiment will now be explained. In view of the similarity between the first and second embodiments, the parts of the second embodiment that are identical to or substantially identical to the parts of the first embodiment will be given the same reference numerals as the parts of the first embodiment. Moreover, the descriptions of the parts of the second embodiment that are identical to the parts of the first embodiment may be omitted for the sake of brevity. Basically, the controller 100 in accordance with the second embodiment is identical to the controller 100 in accordance with the first embodiment, except for a target trajectory generation described below.

With the controller 100 in accordance with the first embodiment, as shown in FIG. 3A, the target trajectory 101 of the flux linkage vector 104 on the dq-axis plane has an involute or substantially involute trajectory expressed by the formula (1). As illustrated in FIG. 4, a target trajectory 203 of the flux linkage vector 206 on the dq-axis plane in accordance with the second embodiment has an involute or substantially involute trajectory further expressed by the following formula (2) in addition to the formula (1):

$$\lambda_{dq} \leq \lambda_{rated} \qquad (2)$$

where $\lambda_{rated}$ represents a rated flux linkage at the given voltage or the DC bus voltage V, and given rotor speed.

Specifically, the M/S changing flux linkage trajectory control module 114 of the controller 100 (see FIG. 2) generates the target trajectory 203 in accordance with the second embodiment in a manner described above. In particular, the rated flux linkage gated can be calculated based on the DC bus voltage signal $V_{DC}$ as understood in the art, and the M/S changing flux linkage trajectory control module 114 can generate the target trajectory 203 in accordance with the second embodiment by further taking account to the formula (2) in addition to the formula (1).

FIG. 4 illustrates an involute target trajectory 201 expressed by the formula (1) on the dq-axis plane with respect to a base circle 202 having a base circle radius $\lambda_{dq}'$, and the involute target trajectory 203 expressed by the formula (1) on the dq-axis plane with respect to a base circle 204 having a base circle radius $\lambda_{dq}$. As illustrated in FIG. 4, the base circle radius $\lambda_{dq}'$ of the base circle 202 is smaller than the base circle radius $\lambda_{dq}$ of the base circle 204. Thus, as understood in the art, the target trajectory 201 also satisfies the formulas (1) and (2). However, the target trajectory 203 is preferable for the reasons stated below.

As illustrated in FIG. 4, the base circle radius $\lambda_{dq}'$ of the base circle 202 is smaller than the base circle radius $\lambda_{dq}$ of the base circle 204, while the q-axis component (maximum absolute value of the q-axis component) of the flux linkage vector 206 on the target trajectory 203 is smaller than the q-axis component (maximum absolute value of the q-axis component) of the flux linkage vector 205 on the target trajectory 201. Generally, the q-axis component of the flux linkage vector becomes smaller as the base circle radius of the base circle becomes larger as illustrated in FIG. 4. Also, with the variable magnetization machine 10, the torque output becomes smaller as the q-axis component of the flux linkage vector becomes smaller. On the other hand, if the base circle radius $\lambda_{dq}$ of the base circle exceeds the rated flux linkage X rated, then the operating pent-point of the flux linkage vector cannot return to a point within the rated voltage circle. Thus, in view of the suppression of the torque fluctuation, the base circle radius $\lambda_{dq}$ of the base circle is set as large as possible within the rated flux linkage $\lambda_{rated}$ as expressed in the formula (2). Specifically, the base circle radius $\lambda_{dq}$ of the base circle is preferably set to the rated flux linkage $\lambda_{rated}$ to derive the target trajectory 203 with respect to the base circle 204 having the base circle radius $\lambda_{rated}$.

With this arrangement, the torque fluctuation during the magnetization control can be suppressed. Thus, the motor efficiency can be improved while suppressing the noise and the vibration during magnetization control.

In accordance with an aspect of the present application, the target trajectory 203 or 201 of the flux linkage vector on the dq-axis plane has the involute or substantially involute trajectory expressed by the formulas (1) and (2). Thus, the torque fluctuation during the magnetization control can be reduced. Therefore, the motor efficiency can be improved while suppressing the noise and the vibration during magnetization control.

Third Embodiment

Figure 5B:
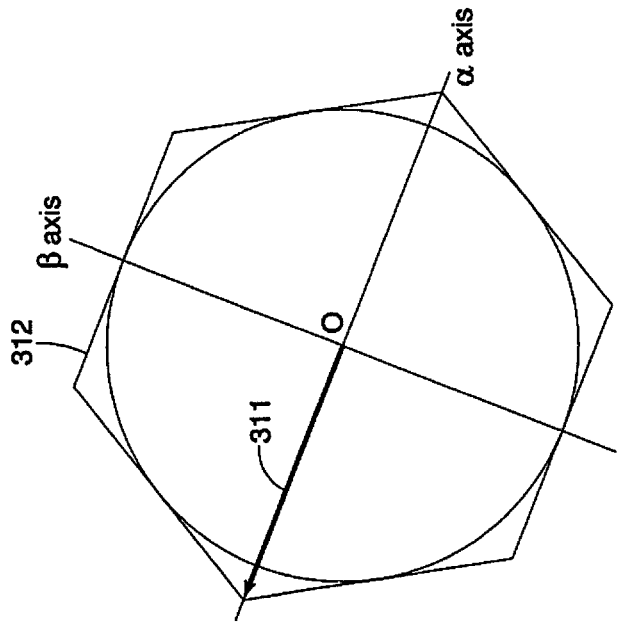
FIG. 5B is a graph illustrating an example of a voltage vector on the αβ-axis plane for the magnetization state control according to the third embodiment.
Figure 5A:
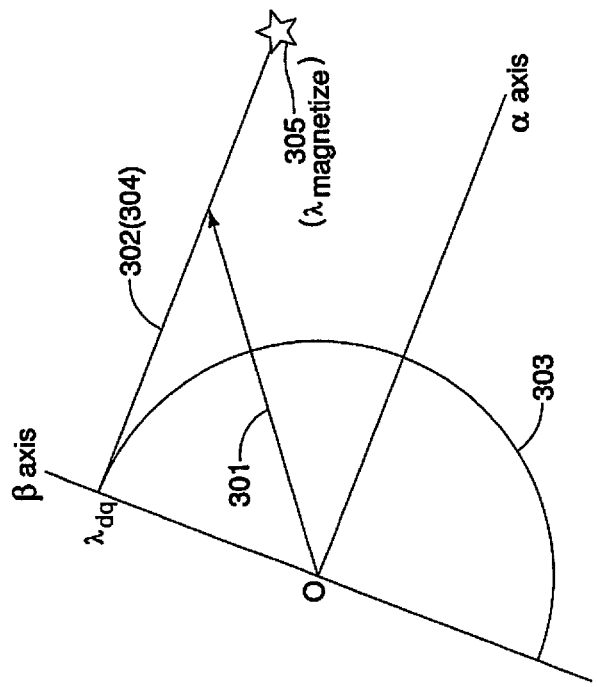
FIG. 5A is a graph illustrating an example of a target trajectory of a flux linkage vector on the αβ-axis plane for a magnetization state control according to a third embodiment.

Referring now to FIGS. 5A and 5B, an example of components of a variable magnetization machine controller 100 (also referred to as a controller 100) in accordance with a third embodiment will now be explained. In view of the similarity between the first and third embodiments, the parts of the third embodiment that are identical to or substantially identical to the parts of the first embodiment will be given the same reference numerals as the parts of the first embodiment. Moreover, the descriptions of the parts of the third embodiment that are identical to the parts of the first embodiment may be omitted for the sake of brevity. Basically, the controller 100 in accordance with the third embodiment is identical to the controller 100 in accordance with the first embodiment, except for a target trajectory generation described below.

With the controller 100 in accordance with the third embodiment, as shown in FIG. 5A, magnetizing to a target magnetization point 305 (e.g., a target magnetization) is completed at a timing when the tangent line 302 (the target trajectory 304) to a base circle 303 with a base circle radius $\lambda_{dq}$ that passes through a target flux linkage $\lambda_{magnetize}$ at the target magnetization point 305 on the αβ-axis plane becomes parallel to the α-axis of the αβ-axis plane. Also, as shown in FIG. 5B, a voltage vector 311 on the αβ-axis plane is maintained the same or substantially the same until the target trajectory 304 (see FIG. 5A) of the flux linkage vector 301 on the αβ-axis plane reaches the base circle 303 with the base circle radius $\lambda_{dq}$ after magnetizing to the target magnetization point 305 (the target flux linkage $\lambda_{magnetize}$). As shown in FIG. 5B, the voltage vector 311 is parallel or substantially parallel to the α-axis of the αβ-axis plane and has a magnitude that is equal to or substantially equal to the inverter maximum output voltage.

Specifically, the M/S changing flux linkage trajectory control module 114 of the controller 100 (see FIG. 2) generates a target trajectory in a manner described in the first or second embodiment. Furthermore, the M/S changing flux linkage trajectory control module 114 generates the target trajectory from the initial operating point to the target magnetization point 305 (the target flux linkage $\lambda_{magnetize}$) such that flux linkage vector 301 reaches the target magnetization point 305 at the timing when the tangent line 302 to the base circle 303 that passes through the target flux linkage $\lambda_{magnetize}$ becomes parallel to the α-axis. Of course, the M/S changing flux linkage trajectory control module 114 can generate the target trajectory from the target magnetization point 305 to the final operating point such that flux linkage vector 301 departs from the target magnetization point 305 at the timing when the tangent line 302 to the base circle 303 that passes through the target flux linkage $\lambda_{magnetize}$ becomes parallel to the α-axis.

Specifically, FIG. 5A illustrates the flux linkage vector 301 on the αβ-axis plane, the target trajectory 304 of the flux linkage vector 301, and the base circle 303 with the base circle radius $\lambda_{dq}$, while FIG. 5B illustrates the voltage vector 311, and the hexagon boundary 312 of the voltage vector 311. As illustrated in the first embodiment, the time variation of the flux linkage vector 301 with respect to the αβ-axis plane corresponds to the required voltage of the variable magnetization machine 10. Thus, when the target trajectory 304 of the flux linkage vector 301 is a straight line as shown in FIG. 5A, then the voltage phase on the αβ-axis plane coincides with or substantially coincides with the direction of the trajectory 304 of the flux linkage vector 301, and remains constant until the flux linkage vector 301 moves to the base circle 303 (e.g., the rated voltage circle). As illustrated in FIG. 5B, the hexagon boundary 312 indicates the range of the voltage vector 311 usable while the variable magnetization machine 10 is driven by the inverter arrangement 118, and has a hexagon shape. As understood in the art, when the tip of the voltage vector 311 is located on the apex of the hexagon boundary 312, the magnitude of the voltage vector 311 becomes maximum. With this arrangement, by completing the magnetization at the timing mentioned above, the required voltage can be applied until the flux linkage vector 301 reaches the base circle 303 (e.g., the rated voltage circle) while the tip of the voltage vector 311 stays at the apex of the hexagon boundary 312, and therefore the voltage use rate can be maximized.

With this arrangement, the speed range during the magnetization state control can be increased, and the magnetization level required for high efficiency can be selected even at the high speed, which also improves the motor efficiency.

In accordance with an aspect of the present application, the magnetization is completed at a timing when the tangent line 302 to the base circle 303 with the base circle radius $\lambda_{dq}$ that passes through the target flux linkage $\lambda_{magnetize}$ at the target magnetization on the αβ-axis plane becomes parallel to the α-axis on the αβ-axis plane. Thus, a higher voltage can be utilized during the magnetization state control relative to a usable voltage for the steady state operating point. Therefore, the speed range during the magnetization state control can be increased, and the magnetization level required for high efficiency can be selected even at the high speed, which also improves the motor efficiency.

In accordance with an aspect of the present application, the voltage vector 311 on the αβ-axis plane is maintained constant or substantially constant, with the voltage vector 311 being parallel to or substantially parallel to the α-axis and has a magnitude that is equal to or substantially equal to the maximum inverter output voltage. Thus, the maximum inverter output voltage can be efficiently utilized for the magnetization control. Therefore, the speed range during the magnetization state control can be increased, and the magnetization level required for high efficiency can be selected even at the high speed, which also improves the motor efficiency.

Fourth Embodiment

Figure 6A:
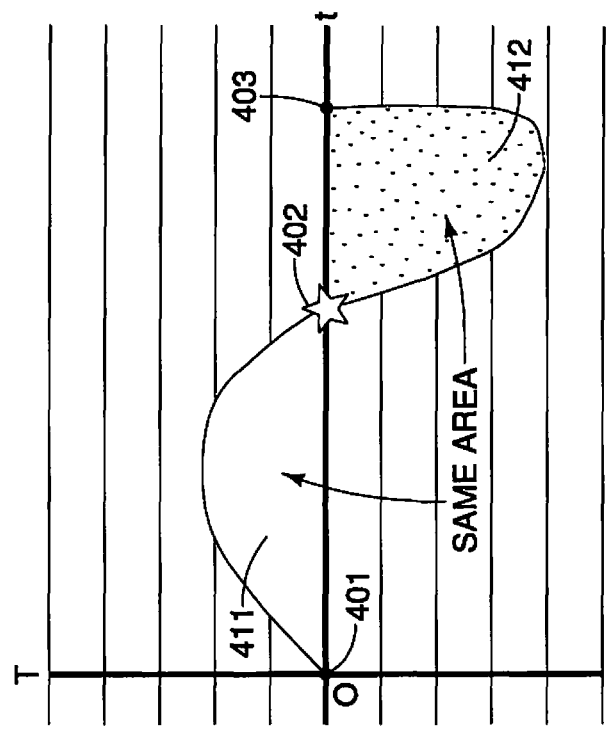
FIG. 6A is a graph illustrating an example of a target trajectory of a flux linkage vector on a dq-axis plane for a magnetization state control according to a fourth embodiment.
Figure 6B:
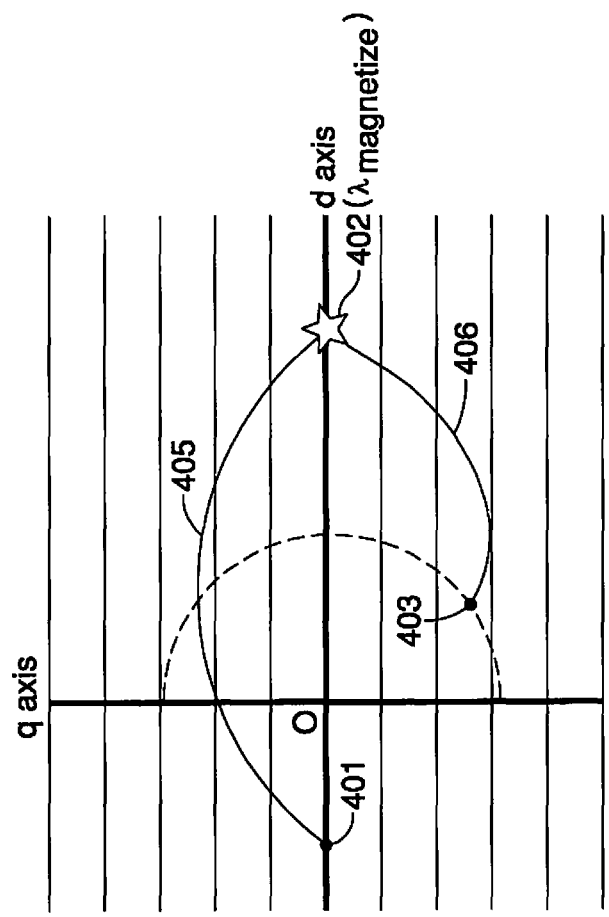
FIG. 6B is a graph illustrating a time variation of a torque output while a magnetization state control according to a fourth embodiment.

Referring now to FIGS. 6A and 6B, an example of components of a variable magnetization machine controller 100 (also referred to as a controller 100) in accordance with a fourth embodiment will now be explained. In view of the similarity between the first and fourth embodiments, the parts of the fourth embodiment that are identical to or substantially identical to the parts of the first embodiment will be given the same reference numerals as the parts of the first embodiment. Moreover, the descriptions of the parts of the fourth embodiment that are identical to the parts of the first embodiment may be omitted for the sake of brevity. Basically, the controller 100 in accordance with the fourth embodiment is identical to the controller 100 in accordance with the first embodiment, except for a target trajectory generation described below.

With the controller 100 in accordance with the fourth embodiment, as shown in FIGS. 6A and 6B, the sum of the time integration 411 of the torque output value from the initial operating point 401 of the magnetization state control (e.g., the start of the magnetization state control) to the completion of magnetizing to the target magnetization point 402 (the target flux linkage $\lambda_{magnetize}$) and the time integration 412 of the torque output value from the completion of magnetizing to the target magnetization point 402 to the final operating point 403 of the magnetization state control (e.g., the end of the magnetization state control) is equal to or substantially equal to zero.

Specifically, the M/S changing flux linkage trajectory control module 114 of the controller 100 (see FIG. 2) generates a target trajectory in a manner described in the first, second or third embodiment. For example, as understood in the art, the M/S changing flux linkage trajectory control module 114 generates the target trajectory 406 from the target magnetization point 402 to the final operating point 403 in a manner described in the first or second embodiment based on the formula (1) or the formulas (1) and (2). The M/S changing flux linkage trajectory control module 114 further estimates or calculates the time integration 412 of the torque output value while the flux linkage vector describes the target trajectory 406 from the target magnetization point 402 to the final operating point 403, and then generates the target trajectory 405 such that the the sum of the time integration 412 and the time integration 411 of the torque output value while the flux linkage vector describes the target trajectory 405 from the initial operating point 401 to the target magnetization point 402 is equal to or substantially equal to zero.

Specifically, FIG. 6A illustrates the target trajectory 405 on the dq-axis plane extending from the initial operating point 401 to the target magnetization point 402 and the target trajectory 406 on the dq-axis plane extending from the target magnetization point 402 to the final operating point 403. FIG. 6B illustrates the time variation of the torque output while the tip of the flux linkage vector moves along the target trajectory 405 and the target trajectory 406. In particular, as mentioned above, the target trajectories 405 and 406 are set such that the sum of the time integration 411 of the torque output from the initial operating point 401 to the target magnetization point 402 and the time integration 412 of the torque output from the target magnetization point 402 to the final operating point 403 is equal to or substantially equal to zero. In other words, the target trajectories 405 and 406 of the flux linkage vector are set such that the area corresponding to the time integration 411 of the positive torque output and the area corresponding to the time integration 412 of the negative torque output are equal to or substantially equal to each other.

Generally, the drive train from the variable magnetization machine to the actual output unit of the vehicle is equivalent to the spring mass system, and has a mechanical resonance. If the torque variation due to the magnetization state control has the frequency component near the mechanical resonance, then the continuous vibration occurs in the drive train. On the other hand, when the time integration value of the time variation of the torque output is set to zero or substantially zero during the entire magnetization state control, then the vibration and the damping are balanced out, which suppresses the continuous vibration.

With this arrangement, the motor efficiency can be improved while suppressing the noise and the vibration during the magnetization control.

In accordance with an aspect of the present application, the sum of the time integration value of the torque output from the start of the magnetization state control to the completion of magnetization to the target magnetization and the time integration value of the torque output from the completion of magnetizing to the target magnetization to the end of the magnetization state control is equal to or substantially equal to zero. Thus, the vibration after the magnetization control can be suppressed. Therefore, the motor efficiency can be improved while suppressing the noise and the vibration during the magnetization control.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A magnetization state control method for a variable magnetization machine using a magnetization state control device including an inverter configured to supply electric power to the variable magnetization machine, and an electronic controller configured to operate the inverter, the method comprising:
   changing, by the controller, an operating state of the inverter to control a magnetization state of a permanent magnet of the variable magnetization machine and a torque of the variable magnetization machine; and
   generating, by the controller, a flux linkage vector to change the magnetization state of the permanent magnet of the variable magnetization machine such that a trajectory of the flux linkage vector has a curved clockwise trajectory on a dq-axis plane about an origin of the dq-axis plane and a magnitude of the flux linkage vector temporally changes, with the dq-axis plane being a synchronous reference frame with a d-axis pointing in a direction of a permanent magnet flux and a q-axis being 90 degrees ahead of the d-axis in a rotational direction of a rotor.

2. The magnetization state control method according to claim 1, wherein
   the flux linkage vector has an initial point at the origin of the dq-axis plane, and
   the magnitude of the flux linkage vector at a timing of a completion of a target magnetization is larger than the magnitude of the flux linkage vector at a later timing thereof when changing the magnetization state to a larger magnetization amount than a current magnetization amount.

3. The magnetization state control method according to claim 1, wherein
   the trajectory of the flux linkage vector on the dq-axis plane has a substantially involute trajectory expressed by the following formula (1):

$$d = \lambda_{magnetize} \cos(-p\omega t) - Vt \sin(\theta - p\omega t)$$

$$q = \lambda_{magnetize} \sin(-p\omega t) - Vt \sin(\theta - p\omega t) \qquad (1)$$

where $\theta=\cos^{-1}(\lambda_{dq}/\lambda_{magnetize})$, $\lambda_{dq}$ represents a base circle radius for the involute trajectory, $\lambda_{magnetize}$ represents a target flux linkage at a target magnetization, V represents a given voltage, p represents a number of pole pairs, w represents a rotor rotating speed, and t represents time after the target magnetization, and the trajectory of the flux linkage vector on an αβ-axis plane has a substantially straight trajectory, with the αβ-axis plane being a stationary reference frame with an α-axis coinciding with a phase coil center and pointing in a direction in which a magnetomotive force is generated such that a magnet flux linkage increases when the α-axis coincides with the d-axis and a β-axis being 90 degrees ahead of the α-axis in the rotational direction of the rotor.

4. The magnetization state control method according to claim 3, wherein the trajectory of the flux linkage vector on the dq-axis plane has the substantially involute trajectory further expressed by the following formula (2):

$$\lambda_{dq} \leq \lambda_{gated} \qquad (2)$$

where $\lambda_{rated}$ represents a rated flux linkage at the given voltage and rotor speed.

5. The magnetization state control method according to claim 1, wherein magnetizing to a target magnetization is completed at a timing when a tangent line to a base circle with a base circle radius $\lambda_{dq}$ that passes through a target flux linkage $\lambda_{magnetize}$ at the target magnetization on an 4-axis plane becomes parallel to an α-axis of the αβ-axis plane.

6. The magnetization state control method according to claim 1, wherein a voltage vector on an αβ-axis plane is maintained substantially the same until the trajectory of the flux linkage vector on the αβ-axis plane reaches a base circle with a base circle radius $\lambda_{dq}$ after magnetizing to a target magnetization, with the voltage vector being substantially parallel to an α-axis of the αβ-axis plane and has a magnitude that is substantially equal to an inverter maximum output voltage.

7. The magnetization state control method according to claim 1, wherein a sum of a time integration of a torque output value from a start of a magnetization state control to a completion of magnetizing to a target magnetization and a time integration of the torque output value from the completion of magnetizing to the target magnetization to an end of the magnetization state control is substantially equal to zero.

8. The magnetization state control method according to claim 1, further comprising calculating a target trajectory of the flux linkage vector on the dq-axis plane based on a rotor rotating speed, a current magnetization level, a target magnetization level, a stator flux linkage amount, and an inverter output voltage capability.

9. The magnetization state control method according to claim 1, further comprising estimating a stator flux linkage amount and a current magnetization level based on at least one of a phase current measurement value and an inverter output voltage command value.

10. A magnetization state control device for a variable magnetization machine, the magnetization state control device comprising:

an inverter configured to supply electric power to the variable magnetization machine; and an electronic controller having at least one microcomputer and configured to operate the inverter, the controller being configured to change an operating state of the inverter to control a magnetization state of a permanent magnet of the variable magnetization machine and a torque of the variable magnetization machine, and the controller being further calculate a target trajectory of a flux linkage vector to generate a flux linkage vector to change the magnetization state of the permanent magnet of the variable magnetization machine such that a trajectory of the flux linkage vector has a curved clockwise trajectory on a dq-axis plane about an origin of the dq-axis plane and a magnitude of the flux linkage vector temporally changes, with the dq-axis plane being a synchronous reference frame with a d-axis pointing in a direction of a permanent magnet flux and a q-axis being 90 degrees ahead of the d-axis in a rotational direction of a rotor.

11. The magnetization state control device according to claim 10, wherein the flux linkage vector has an initial point at the origin of the dq-axis plane, and the magnitude of the flux linkage vector at a timing of a completion of a target magnetization is larger than the magnitude of the flux linkage vector at a later timing thereof when changing the magnetization state to a larger magnetization amount than a current magnetization amount.

12. The magnetization state control device according to claim 10, wherein the controller is further configured to calculate the target trajectory of the flux linkage vector on the dq-axis plane based on a rotor rotating speed, a current magnetization level, a target magnetization level, a stator flux linkage amount, and an inverter output voltage capability.

13. The magnetization state control device according to claim 10, wherein the controller is further configured to estimate a stator flux linkage amount and a current magnetization level based on at least one of a phase current measurement value and an inverter output voltage command value.

* * * * *